March 24, 1942. C. F. M. VAN BERKEL 2,277,279
SLICING MACHINE
Filed June 3, 1939
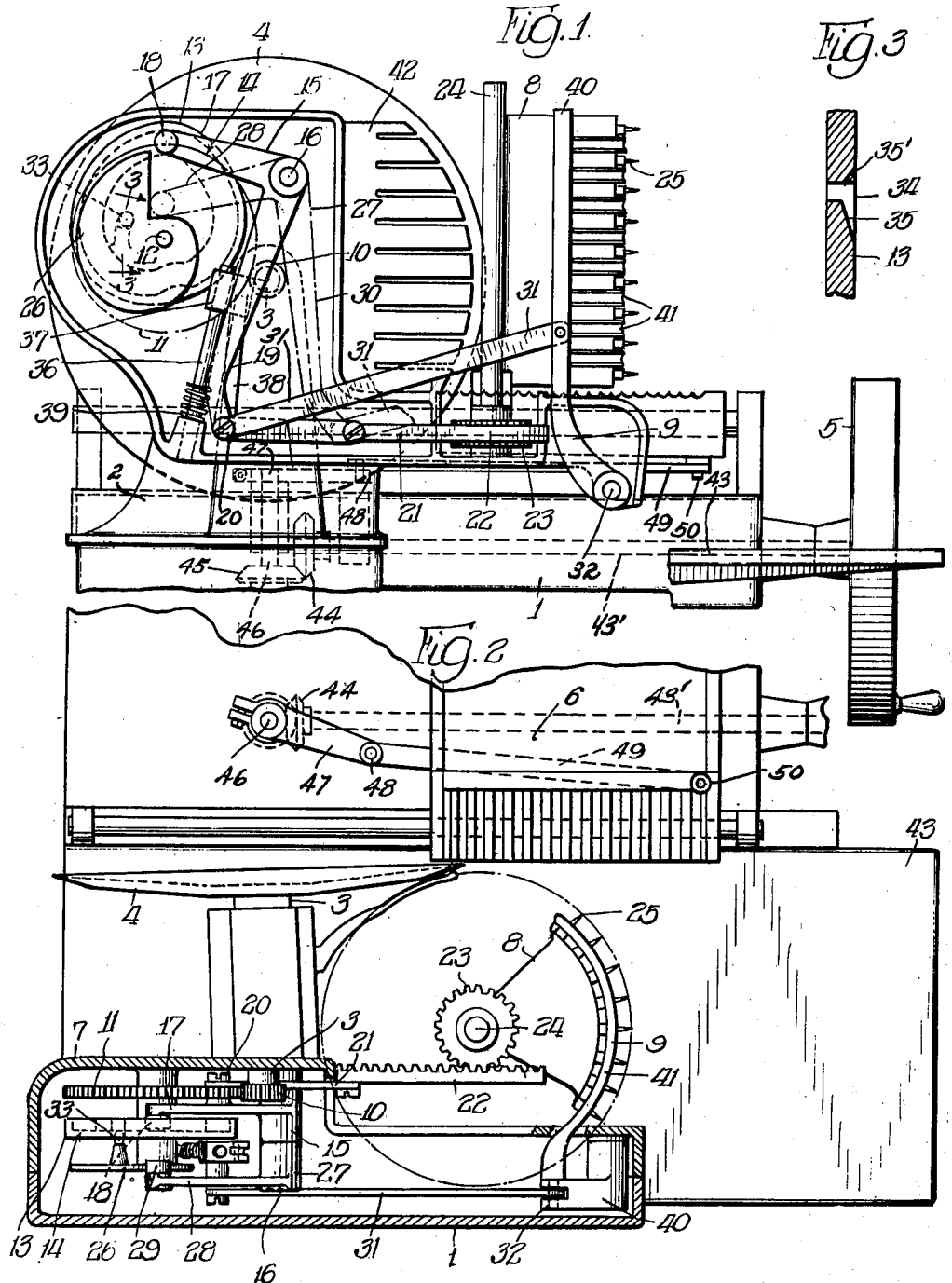
INVENTOR.
Cornelis F. M. Van Berkel,
BY John A. Marzall
ATTORNEY.

Patented Mar. 24, 1942

2,277,279

UNITED STATES PATENT OFFICE 2,277,279

SLICING MACHINE

Cornelis F. M. van Berkel, Wassenaar, Netherlands, assignor to U. S. Slicing Machine Company, La Porte, Ind., a corporation of Indiana Application June 3, 1939, Serial No. 277,216
In Great Britain June 9, 1938

11 Claims. (Cl. 146—94)

This invention relates to slicing machines in general and particularly to a slicing machine having a stationary circular driven knife. More specifically, the invention relates to a slicing machine having a slice conveyor and a discharge fly for removing the slices from the conveyor.

An important object of the present invention is the provision of new and improved means controlled by the operation of a driven knife or knife driving part to operate a slice impaler and conveyor in proper relationship with the movement of the carriage, and also to operate a discharge fly in proper timed relationship with respect to the movement of the carriage and the operation of the slice conveyor.

Another object of the invention is the provision of a slicing machine having an operative connection from the knife shaft or other proximal parts of the knife drive to the conveyor so that all the component parts of the slice stacking mechanism can be mounted above the level of the usual slice receiving table or plate upon which the slices are discharged by the fly.

Another important object of the invention is the provision of new and novel slice stacking mechanism applied to a slicing machine having a reciprocating supporting carriage and a rotary knife, the conveyor of the slice stacking mechanism being operatively connected to the knife shaft or other proximal part of the knife drive so as to have positively imparted to it from said shaft or part a to-and-fro rotational motion in timed relationship with the motion of the carriage.

Still another object of the invention is the provision of a slicing machine having a rotary knife and slice stacking mechanism, the conveyor of which is driven rotationally to-and-fro by a conveyor cam through the intermediary of a cam following lever and intermeshing toothed gears, said cam being geared to said knife to rotate uni-directionally.

A further object of the invention is to provide new and improved means for operating a slice conveyor and a discharge fly in proper timed relationship with the movement of the carriage, there being cams for operating the mechanism controlling the conveyor and the discharge fly, the cams being separate but adapted to be operated in proper timed relationship by the rotation of the slicing knife.

Numerous other objects and advantages will be apparent throughout the progress of the following specification.

The accompanying drawing illustrates a selected embodiment of the invention and the views therein are as follows:

Fig. 1 is a detail elevational view and embodying the invention;

Fig. 2 is a detail plan section; and

Fig. 3 is a detail sectional view on the line 3—3 of Fig. 1.

The particular slicing machine herein shown for the purpose of illustrating the invention comprises a base or stand 1 upon which a knife supporting bracket 2 is carried. The knife supporting bracket 2 carries a journal for the knife shaft 3, upon which shaft the knife 4 is rotatably mounted.

The knife 4 may be rotated by the turning of a crank 5, there being mechanism connecting the shaft to which the crank 5 is fastened and the knife shaft 3 so that rotation of the crank 5 will rotate the knife. This mechanism may be of any conventional construction which is well known in the art. Moreover, the rotation of the crank 5 is adapted to reciprocate the carriage 6 back and forth in a rectilineal path in a manner well known in the art. Feed means (not shown) are provided to feed substance across the carriage a distance equal to the thickness of a slice to be cut during each feeding stroke of the carriage.

The base or housing 1 of the slicing machine may include an additional or auxiliary casing 7 which, if desired, may be a part or an extension of the knife supporting bracket 2. This housing is adapted to encase mechanism for operating a slice conveyor 8 and a discharge fly 9. The knife shaft 3 is adapted to have a gear or driving member 10 rigidly fixed to the shaft and is adapted to drive a gear 11, Fig. 2. The gear 11 is mounted on a shaft 12 which carries a cam 13 having a race 14. A crank 15 is mounted on a shaft 16, the arm 17 of the crank 15 carrying a cam roller 18 which is adapted to be received in the cam race 14 of the cam 13. The arm 19 of the crank 15 is pivotally connected at 20 to a link 21 which is operatively connected to a rack member 22. The rack member 22 is adapted to engage a gear 23 fixed to the rotatable shaft 24 of the conveyor 8. Thus, during the rotation of the knife 4 the gear 11 will cause rotation of the shaft 12, rotating the cam 13. The rotation of the cam 13 therefore causes operation of the crank 15. The arm 19 of the crank 15 therefore will cause forward and backward movement of the rack 22, and inasmuch as the rack 22 meshes with the gear 23 on the slice conveyor 8, the slice conveyor 8 will be caused to rotate or oscillate back and forth. The slice conveyor 8 may be of a type known in the art and may comprise a sector-shaped element having a plurality of spaced impaling prongs 25.

A cam 26 is also operatively mounted on the aforesaid shaft 12 and is adapted to operate a crank 27 mounted on the shaft 16. The crank 27 has a crank arm 28 which carries a cam roller 29 adapted to engage the periphery of the cam 26. Spring means (not shown) are attached to the crank 27 and cause the roller 29 to be in constant engagement with the periphery of the cam 26. The arm 30 of the crank 27 is operatively connected to a link 31 which is operatively connected to the discharge fly 9. The discharge fly 9 is pivoted at 32 to a part of the machine frame. Therefore, during rotation of the cam 26 the crank 27 will be operated by the said cam, and the movement of the crank arm will cause operation of the discharge fly 9 on its pivot 32.

It is desirable that the discharge fly operate at a predetermined position, which position will be when the slice conveyor moves to slice discharging position, as shown in Fig. 2. Therefore, the cams 13 and 26 must operate in proper timed relationship and in proper sequence. While the cams 13 and 26 are separately mounted on the shaft 12, a driving connection is provided between these two cams. This driving connection may comprise a plunger 33 carried by the cam 26 and adapted to engage a slot or cut-out 34 provided in the cam 13, Fig. 3. The cut-out or slot 34 is provided with a beveled surface 35, Fig. 3, so that a positive driving connection is provided between the two cams when the plunger engages the straight surface 35', Fig. 3. Therefore, when the knife is driven in its usual direction the cams will operate together. However, should the knife be accidentally rotated in the wrong direction, the plunger 33 will be guided by the incline 35 and thereupon prevent the driving connection between the two cams, whereby no damage can be done to the mechanism.

In order to insure relatively flexible operation of the discharge fly 9, cushion means are provided for the crank 27 so as to overcome noise and pounding when the cam roller 29 engages the straight part of the cam 26 as it drops to position. This cushioning means may comprise a rod 36 operatively supported in a part of the frame and upon which a collar 37 is slidably mounted. This collar 37 has connected thereto a link 38 which is also connected to the arm 30 of the crank 27. A spring 39 is located at the bottom of the rod 36 and receives the downward thrust or pound of the block or collar 37. Thus, when the spring (not shown) pulls down the cam roller 29 against the straight side of the cam 26, the pounding or hammering action is averted because of the positive connection between the collar 37 with the crank arm 27 through the link 38.

The fly 9 comprises an arm 40 to which there is connected a plurality of spaced fingers 41. The spaces between the fingers permit the prongs on the slice conveyor to pass through the fly.

A slice deflector 42, Fig. 1, is arranged adjacent the knife 4 and deflects slices as they are cut on the impaling prongs of the slice conveyor.

The hand crank or hand wheel 5 operates mechanism of the usual type for causing reciprocation of the carriage. The means herein shown comprises a fly wheel shaft 43' which is connected to the fly wheel 5 and is rotated thereby. A pinion or gear 44 is fixed to the end of the shaft 43' and drives a pinion 45 on the shaft 46. A crank 47 is fixed to the shaft 46 and is pivoted at 48 to a link 49 pivoted at 50 to the carriage. Therefore, during rotative movement of the crank handle 5 the carriage 6 is adapted to be reciprocated back and forth. The shaft 46 is operatively connected by means not shown to the slicing knife shaft 3 to rotate this shaft. The shaft 3 has mounted thereon the pinion 10, as previously described, for operating the aforementioned mechanism for controlling the operation of the discharge fly and the slice conveyor.

The construction and arrangement of the parts is such that when the machine is operated, such as by rotating the crank arm or wheel 5, the carriage is reciprocated back and forth to have slices cut from substance on the carriage 6. As the substance is being cut by the knife 4 the cut slices are deflected by the slice deflector 42, Fig. 1, and become impaled upon the prongs on the slice conveyor. The conveyor is timed with respect to the movement of the carriage so that the slice conveyor will be in proper conveying position to receive a slice as the slice is being cut by the knife. The continued operation of the machine causes the carriage to move throughout its entire path and then be returned toward the operator where the machine is ready for the next succeeding slicing operation. The slice conveyor is adapted to receive the slices and deliver them to slice discharging position, as shown in Fig. 2. When the conveyor has moved to the position shown in Fig. 2, the discharge fly is in proper position to operate to discharge and remove slices impaled on the prongs on the slice conveyor. The discharge fly mechanism is controlled by the movement of the carriage and operates synchronously in timed relationship with the operation of the discharge fly so that the conveyor will operate at the proper time. The slicing machine may include a slice receiving tray 43.

The slice stacking mechanism herein provided has a reciprocating substance supporting carriage, a rotary knife and a slice receiver, the knife and receiver both being situated or located at the same side of the carriage. The conveyor is operatively connected to a unidirectionally working part, as, for example, the knife shaft as shown, or to some other operative part of the knife driving mechanism. This latter mechanism is also located at the said side of the knife and above the level of the slice receiver and being adapted to impart to the conveyor a to-and-fro rotational motion in timed relationship with the motion of the carriage, at least during the slicing stroke. Means are also provided on the carriage for feeding the substance transversely across the carriage to proper cutting position so that slices of the proper desired thickness will be cut from the substance during the movement of the carriage on the cutting stroke.

The invention provides a slicing machine which has mechanism controlled by the rotative movement of the knife and correlated with the movement of the carriage. Therefore, when a slice is being cut it is deflected by the slice deflector into the path of the rotating or oscillating slice conveyor where the slice is impaled on the prongs on the conveyor and then moved to position with respect to the fly, and the fly is operated in timed relationship with the operation of the slice conveyor so that the slice is discharged from the slice conveyor at the proper moment.

All the parts are constructed and arranged and operate synchronously and in proper timed relation to effect the proper steps in the correct sequence. The construction of the elements is relatively simple, and positive in operation by means of the cam and crank construction. The cams are operatively connected to operate together in a predetermined direction, but prevented from operating together when the device is inadvertently operated in a wrong direction. Furthermore, means have been provided to insure the proper operation of the elements because of the particular shape and construction of the cams. Also, undue noises and hammering of the parts are prevented by the particular type of resilient connection with one of the arms.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a slicing machine having a carriage, a slicing knife, means for operating the carriage, and knife driving means driven by said last named means, the combination with a slice conveyor and discharge fly, and driving means driven by the knife driving means, for operating the conveyor and fly in timed relationship with the movement of the carriage, said last named means comprising a cam, a driving connection between the cam and conveyor, a second cam, a driving connection between the second cam and the fly to operate the fly, and a driving connection between said cams to cause said cams to operate together in proper timed relationship, said driving connection between said cams becoming disconnected upon operation in a predetermined direction.

2. A slicing machine comprising a rotatably mounted knife shaft, means to drive said shaft, a knife mounted on the shaft, a gear on the shaft, a second gear driven by the first gear, a shaft upon which the second gear is mounted, a pair of cams on said second shaft, a rotatably mounted conveyor, means connecting said conveyor with one of said cams, a pivotally mounted fly, means connecting the fly with the other of said cams, and a driving connection between said cams.

3. A slicing machine comprising a rotatably mounted knife shaft, means to drive said shaft, a knife mounted on the shaft, a gear on the shaft, a second gear driven by the first gear, a shaft upon which the second gear is mounted, a pair of cams on said second shaft, a rotatably mounted conveyor, means connecting said conveyor with one of said cams, a pivotally mounted fly, means connecting the fly with the other of said cams, and a driving connection between said cams, said driving connection comprising a plunger carried by one of said cams and engageable with a cut-out in the other of said cams, said driving connection being characterized in that said plunger drives one of said cams in one direction but is prevented from driving said cam in an opposite direction.

4. A slicing machine comprising a rotatably mounted knife shaft, means to drive said shaft, a knife mounted on the shaft, a gear on the shaft, a second gear driven by the first gear, a shaft upon which the second gear is mounted, a pair of cams on said second shaft, a rotatably mounted conveyor, means connecting said conveyor with one of said cams, a pivotally mounted fly, means connecting the fly with the other of said cams, a driving connection between said cams, a carriage reciprocal in a rectilinear path past the cutting plane of the knife, means to reciprocate the carriage, and means causing operation of the fly and conveyor by said cams in timed relationship with the reciprocal movement of the carriage.

5. A slicing machine comprising a rotatably mounted knife shaft, means to drive said shaft, a knife mounted on the shaft, a gear on the shaft, a second gear driven by the first gear, a shaft upon which the second gear is mounted, a pair of cams on said second shaft, a rotatably mounted conveyor, means connecting said conveyor with one of said cams, a pivotally mounted fly, means connecting the fly with the other of said cams, a driving connection between said cams, and cushion means on one of said cam connecting means.

6. In a slicing machine of the character described, a circular slicing knife, a shaft for said knife extending rearwardly thereof, a substance carriage reciprocal past the forward face of the knife, drive means for rotating said knife shaft and reciprocating said carriage, a rotatably mounted slice conveyor, a pivotally mounted discharge fly, a pair of cranks mounted behind said knife and operable substantially entirely within the projected area of the knife, an operative connection between one of said cranks and said conveyor, an operative connection between the other of said cranks and said discharge fly, cam means positioned behind said knife for operating said cranks, and means driven by said knife shaft for operating said cam means to effect operation of said conveyor and fly in timed relation to movement of said carriage.

7. In a slicing machine of the character described, a circular slicing knife, a shaft for said knife extending rearwardly thereof, a substance carriage reciprocal past the forward face of the knife, drive means for rotating said knife shaft and reciprocating said carriage, a rotatably mounted slice conveyor, a pivotally mounted discharge fly, a pair of cranks mounted behind said knife and operable substantially entirely within the projected area of the knife, an operative connection between one of said cranks and said conveyor, an operative connection between the other of said cranks and said discharge fly, a pair of cams positioned behind said knife means for separately operating said cranks, and means driven by said drive means for operating said cams to effect operation of said conveyor and fly in timed relation to movement of said carriage.

8. In a slicing machine of the character described, a circular slicing knife, a shaft for said knife extending rearwardly thereof, a substance carriage reciprocal past the forward face of the knife, drive means for rotating said knife shaft and reciprocating said carriage, a rotatably mounted slice conveyor, a pivotally mounted discharge fly, a pair of cranks mounted behind said knife and operable substantially entirely within the projected area of the knife, an operative connection between one of said cranks and said conveyor, an operative connection between the other of said cranks and said discharge fly, a pair of cams positioned behind said knife means for separately operating said cranks, means driven by said drive means for operating one of said cams, and a one-way drive means between said cams for normally effecting operation of the other of said cams.

9. In a slicing machine of the character described, a circular slicing knife, a shaft for said knife extending rearwardly thereof, a substance carriage reciprocal past the forward face of the knife, drive means for rotating said knife shaft and reciprocating said carriage, a rotatably mounted slice conveyor, a pivotally mounted discharge fly, a pair of cranks mounted rearwardly of said knife for operation about axes substantially parallel to said knife shaft, an operative connection between one of said cranks and said conveyor, an operative connection between the other of said cranks and said discharge fly, and means driven by said drive means for operating said cranks to effect operation of the conveyor and fly in timed relation to movement of said carriage.

10. In a slicing machine of the character described, a circular slicing knife operable in a substantially vertical plane, a substance carriage reciprocal past the forward face of said knife, drive means for rotating said knife and reciprocating said carriage, a rotatably mounted slice conveyor, a pivotally mounted discharge fly, a pair of cranks positioned behind said knife and mounted for operation in substantially vertical planes and substantially entirely within the projected area of the knife, an operative connection between one of said cranks and said conveyor, an operative connection between the other of said cranks and said discharge fly, and means driven by said drive means for operating said cranks to effect operation of the conveyor and fly in timed relation to movement of said carriage.

11. In a slicing machine of the character described, a circular slicing knife operable in a substantially vertical plane, a substance carriage reciprocal past the forward face of said knife, drive means for rotating said knife and reciprocating said carriage, a rotatably mounted slice conveyor, a pivotally mounted discharge fly, a pair of cranks positioned behind said knife and mounted for operation in substantially vertical planes and substantially entirely within the projected area of the knife, an operative connection between one of said cranks and said conveyor, an operative connection between the other of said cranks and said discharge fly, means driven by said drive means for operating said cranks to effect operation of the conveyor and fly in timed relation to movement of said carriage, and a slice receiving surface positioned adjacent said conveyor and fly and located in a plane below said cranks and the operating means thereof.

C. F. M. VAN BERKEL.